United States Patent [19]

Shanley, II et al.

[11] 4,404,593

[45] Sep. 13, 1983

[54] BRIGHTNESS CONTROL CIRCUIT

[75] Inventors: Robert L. Shanley, II, Indianapolis, Ind.; Leopold A. Harwood, Bridgewater, N.J.

[73] Assignee: RCA Corporation, New York, N.Y.

[21] Appl. No.: 296,863

[22] Filed: Aug. 27, 1981

[51] Int. Cl.³ ............................................. H04N 5/14
[52] U.S. Cl. .................................... 358/168; 358/172
[58] Field of Search .................. 358/168, 39, 172, 34, 358/74, 27, 243

[56] References Cited

U.S. PATENT DOCUMENTS 3,598,913 8/1971 Janssen ................................. 358/168
4,197,557 4/1980 Tuma et al. ........................... 358/34
4,967,048 1/1978 Norman ................................ 358/243

FOREIGN PATENT DOCUMENTS 1225862 3/1971 United Kingdom .................. 358/39

Primary Examiner—John C. Martin
Attorney, Agent, or Firm—Eugene M. Whitacre; Paul J. Rasmussen; Ronald H. Kurdyla

[57] ABSTRACT

An image brightness control circuit is included in a television receiver which also includes a video signal black level clamp comprising a charge storage capacitor. The clamp operates during video signal blanking intervals, between picture intervals, for establishing a video signal black reference level. A variable brightness control voltage is applied to the clamp-controlled video signal only during picture intervals of the video signal. Brightness control is thereby achieved without introducing a visible gradual change in the brightness of a reproduced image, which would otherwise be produced by the action of the clamp charging or discharging the storage capacitor.

2 Claims, 3 Drawing Figures

BRIGHTNESS CONTROL CIRCUIT

This invention concerns a circuit for varying the brightness level of an image reproduced by a television receiver or a similar video signal processing system. In particular, the invention concerns a brightness control circuit that operates without producing a visible transient delay response.

Television receivers commonly employ control circuits, sometimes referred to as DC restoration or black level clamping circuits, for establishing a desired black reference level of a video signal so that the gray scale information content (i.e., light to dark image information content) is faithfully reproduced. These circuits often including a capacitor for storing a DC reference voltage, representative of a desired video signal black reference level, which determines the DC level of the video signal. Since the DC level of a video signal is representative of the brightness of a reproduced image, it has been recognized that the brightness of a reproduced image can be conveniently controlled by varying the DC reference voltage associated with the DC restoration control circuit. This is usually accomplished by means of a viewer adjustable brightness control potentiometer coupled to the DC restoration circuit.

With this type of brightness control arrangement, as shown for example in U.S. Pat. Nos. 4,197,557 and 4,067,048, the DC charge on the storage capacitor associated with the DC restoration circuit, and thereby the brightness determinative DC level of a reproduced image, are varied in response to the setting of the brightness control. However, the time constant of such a DC restoration circuit is such that the voltage on the storage capacitor does not change instantaneously with a change in the setting of the brightness control. As a result, the brightness response of a reproduced image exhibits a momentary transition delay, or gradual change, which can be disturbing to some viewers.

A similar transition delay is present in receivers which employ an automatic kinescope beam current limiting circuit in conjunction with the DC restoration control circuit, for the purpose of reducing the DC level of the video signal and thereby limiting excessive kinescope beam current. Also, the presence of the DC restoration charge storage capacitor in the beam current limiter control loop can adversely affect the stability of the beam current limiter control loop.

A brightness control arrangement according to the present invention is included in a video signal processing system which also includes a black level clamp with an associated charge storage capacitor. The clamp operates during video signal image blanking intervals for sensing and maintaining a desired value for the black reference level of the video signal. In order to avoid an undesirable transition operating delay by the clamp in response to a variable brightness control voltage, brightness control is accomplished by applying a variable brightness control voltage to the video signal only during image intervals of the video signal, at which times the clamp does not function.

In accordance with a feature of the invention, the system also comprises means for developing a beam current control voltage respresentative of excessive beam current conduction of an image reproducing kinescope included in the system. The beam current control voltage is selectively applied to the video signal only during image intervals of the video signal.

Figure 1:
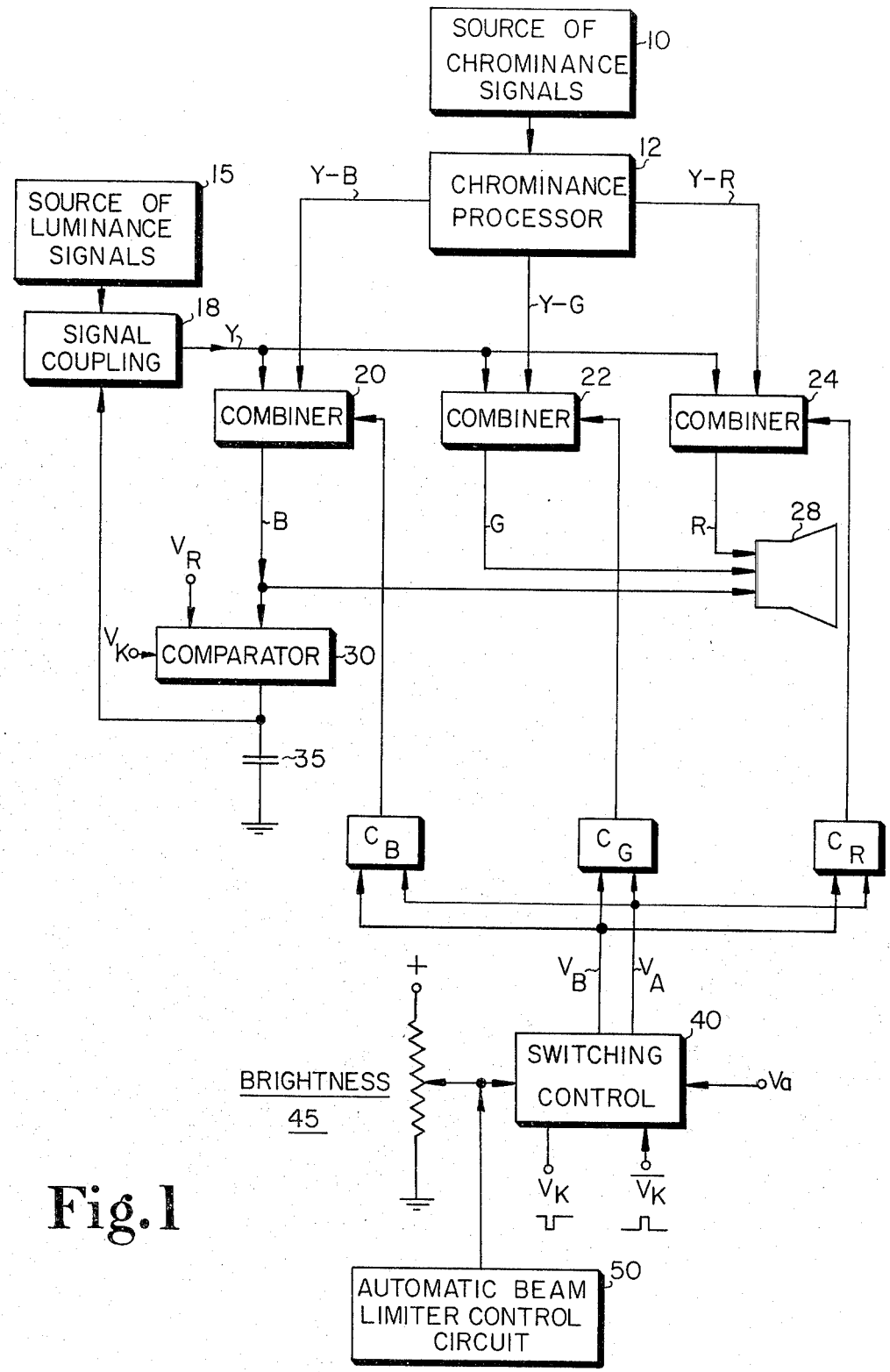
FIG. 1 shows a portion of a color television receiver including brightness control apparatus according to the present invention.

In FIG. 1, chrominance signals from a source 10 are supplied to a chrominance processor 12 for developing Y-R, Y-B and Y-G color difference signals.

Luminance signals (Y) from a source 15 are coupled via a network 18 to signal combiners 20, 22 and 24 where the luminance signal is combined with the color difference signals from processor 12 to produce color image representative signals R, G and B. These signals are coupled via suitable signal coupling circuits to a color kinescope 28.

The luminance signal from source 15 and as applied to combiners 20, 22 and 24 comprises periodic horizontal image intervals containing picture information, and a periodic horizontal blanking interval between each horizontal image interval. The blanking interval contains a horizontal sync pulse interval, and a reference interval following the sync interval. The reference interval contains a DC black reference level which occurs during the so-called "back porch" time of the blanking interval.

A control network including a comparator 30 and a storage capacitor 35 serves as a black level clamping (DC restoration) network for maintaining the black reference level of the luminance signal, and thereby the black reference level of the R, G, B color signals, at a desired value. Specifically, the control network serves to compensate for slowly varying changes in the black reference level of the video signal, such as may be caused by temperature effects, component aging, and variations of the black reference level from one television signal channel to another.

Comparator 30 is keyed to operate during the luminance signal black reference intervals in response to keying signal $V_K$. When operating, comparator 30 senses and compares the DC black reference as associated with the B signal output of combiner 20, with a stable DC reference voltage $V_R$. An output DC control voltage from comparator 30 is representative of the difference between the sensed video signal black level voltage and reference voltage $V_R$, and is stored by capacitor 35. The control voltage from capacitor 35 is applied to luminance signal coupling network 18 for modifying the DC black reference level of the luminance signal (Y) as required to minimize the difference between the black level reference voltage of signal B and reference voltage $V_R$ sensed by comparator 30. By this closed loop control mechanism the black reference level of the R, G, B signals is maintained at a desired value.

Brightness control of a reproduced image is accomplished by means of an arrangement including a switching control network 40, a viewer adjustable brightness control potentiometer 45, and coupling networks $C_B$, $C_G$ and $C_R$ in response to an input brightness control voltage from network 45, an input fixed DC bias voltage $V_a$, and complementary keying signals $V_K$ and $\overline{V}_K$. An output DC voltage $V_B$ corresponds to a variable DC brightness control voltage derived from the wiper of control 45 in accordance with the setting of control 45.

An output DC bias reference voltage $V_A$ corresponds to a fixed DC voltage derived from bias voltage Va. Switching control network 40 responds to keying signals $V_K$ and $\overline{V}_K$ for providing brightness control output voltage $V_B$ only during image intervals of the video signal, and for providing reference bias output voltage $V_A$ during the black level reference intervals of the video signal. Accordingly, brightness control voltage $V_B$ is applied to the B, G and R color signals via coupling networks $C_B$, $C_G$, $C_R$, and combiners 20, 22, 24 during picture intervals only, and reference bias voltage $V_A$ is applied to the color signals via coupling networks $C_B$, $C_G$, $C_R$ and combiners 20, 22, 24 only during the black reference intervals.

Bias voltage Va is preferably derived from the same source from which black level clamp reference voltage $V_R$ is derived so that voltages Va and $V_R$ track closely with respect to temperature and operating supply variations, for example. In this embodiment, picture interval brightness control voltage $V_B$ and blanking interval bias voltage $V_A$ from switching control circuit 40 are substantially equal when control 45 is at a mid-range setting, and brightness control voltage $V_B$ is symmetrically variable relative to fixed voltage $V_A$.

The voltage on comparator capacitor 35 does not change as brightness control 45 is adjusted, since brightness control voltage $V_B$ is applied to the video signal only during the picture information intervals of the video signal, when the black level clamp including comparator 30 does not operate. This manner of brightness control avoids a visible transition operating delay (i.e., a disturbing momentary flash or fade in the picture brightness level) which would otherwise be produced if the black level clamp were to respond to the brightness control voltage. In that case, the time constant associated with the charging and discharging of comparator output capacitor 35 is such that the voltage on capacitor 35 does not change instantaneously in response to the output control signal from comparator 30, causing a transition operating delay.

The described transition operating delay is also advantageously avoided with respect to the operation of an automatic kinescope beam current limiter control circuit 50. Beam current control circuit 50 responds to a sensed condition of excessive kinescope beam current, and supplies an output control voltage to the same input of switching control network 40 to which the brightness control voltage is applied. A version of the control voltage from beam limiter control circuit 50 appears at the brightness control output ($V_B$) of network 40 only during the video signal picture intervals, and exhibits a magnitude and sense for varying the DC level of the video signal (and thereby picture brightness) in a direction to limit excessive kinescope current conduction above a given level. The objectionable gradual change in image brightness otherwise introduced by the operation of comparator 30 in charging and discharging capacitor 35 in response to the beam limiter action is avoided. In addition to avoiding this transition delay effect, utilizing the beam limiter control voltage in this manner has been found to improve the stability of the black level clamping control loop including comparator 30, which may otherwise be jeopardized, since the beam limiter circuit operates independently of the black level clamp control loop. For example, the sensing and control circuits associated with automatic beam current limiter circuit 50 can be of the type shown in U.S. Pat. No. 4,253,110, Harwood, et al., hereby incorporated by reference.

Figure 2:
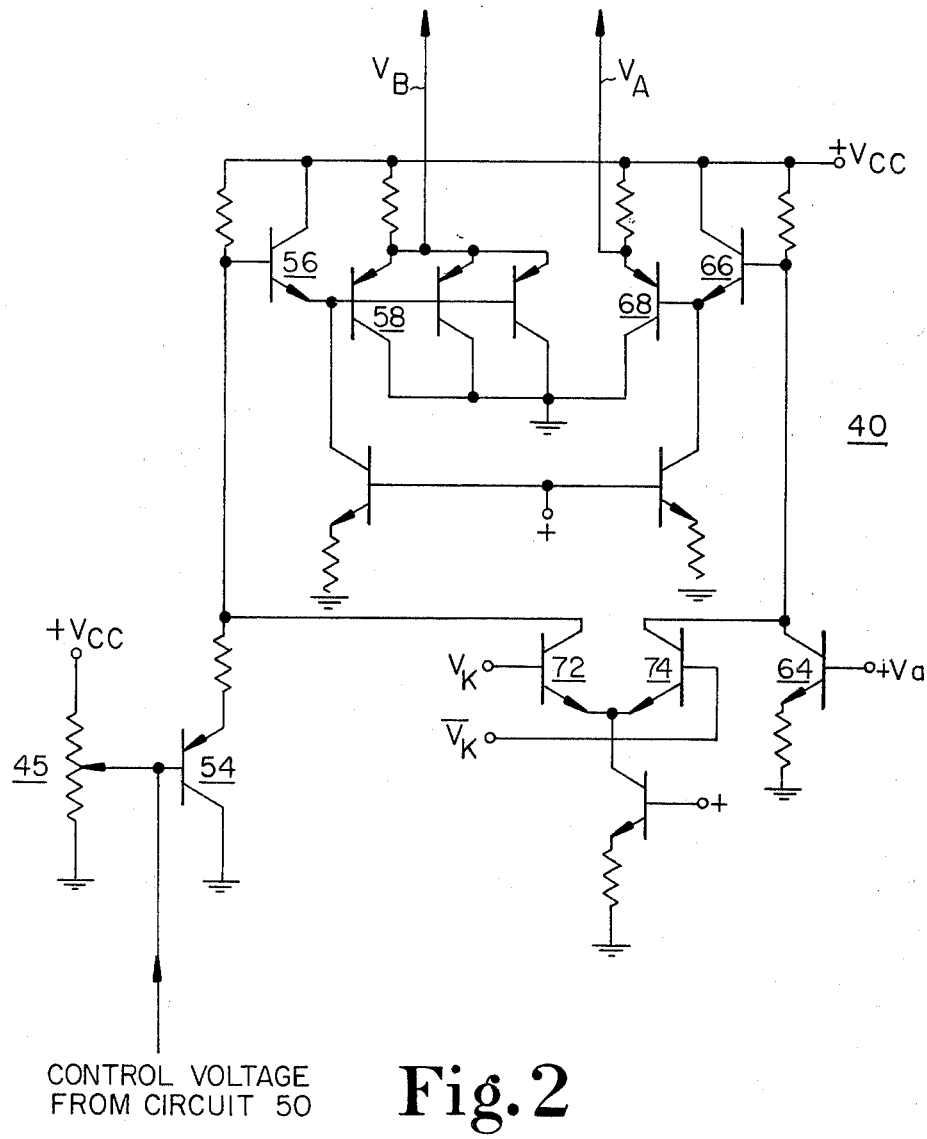
FIG. 2 shows circuit details of a portion of the brightness control apparatus of FIG. 1.

FIG. 2 shows circuit details of switching control network 40 in FIG. 1. The control voltage from the wiper of brightness control 45 is translated via a circuit including transistors 54, 56 and 58 to develop control voltage $V_B$ at the emitter output of transistor 58. Bias voltage Va is translated via a circuit including transistors 64, 66 and 68 to develop black reference interval reference bias voltage $V_A$ at the emitter output of transistor 68. The relative conduction of the translating circuits from which voltages $V_B$ and $V_A$ are respectively derived is controlled by means of a switching circuit including differentially connected transistors 72 and 74 which conduct in a complementary manner in response to keying signals $V_K$ and $\overline{V}_K$. The manner in which voltages $V_B$ and $V_A$ are applied to the video signal can be seen from the circuit arrangement of FIG. 3.

Figure 3:
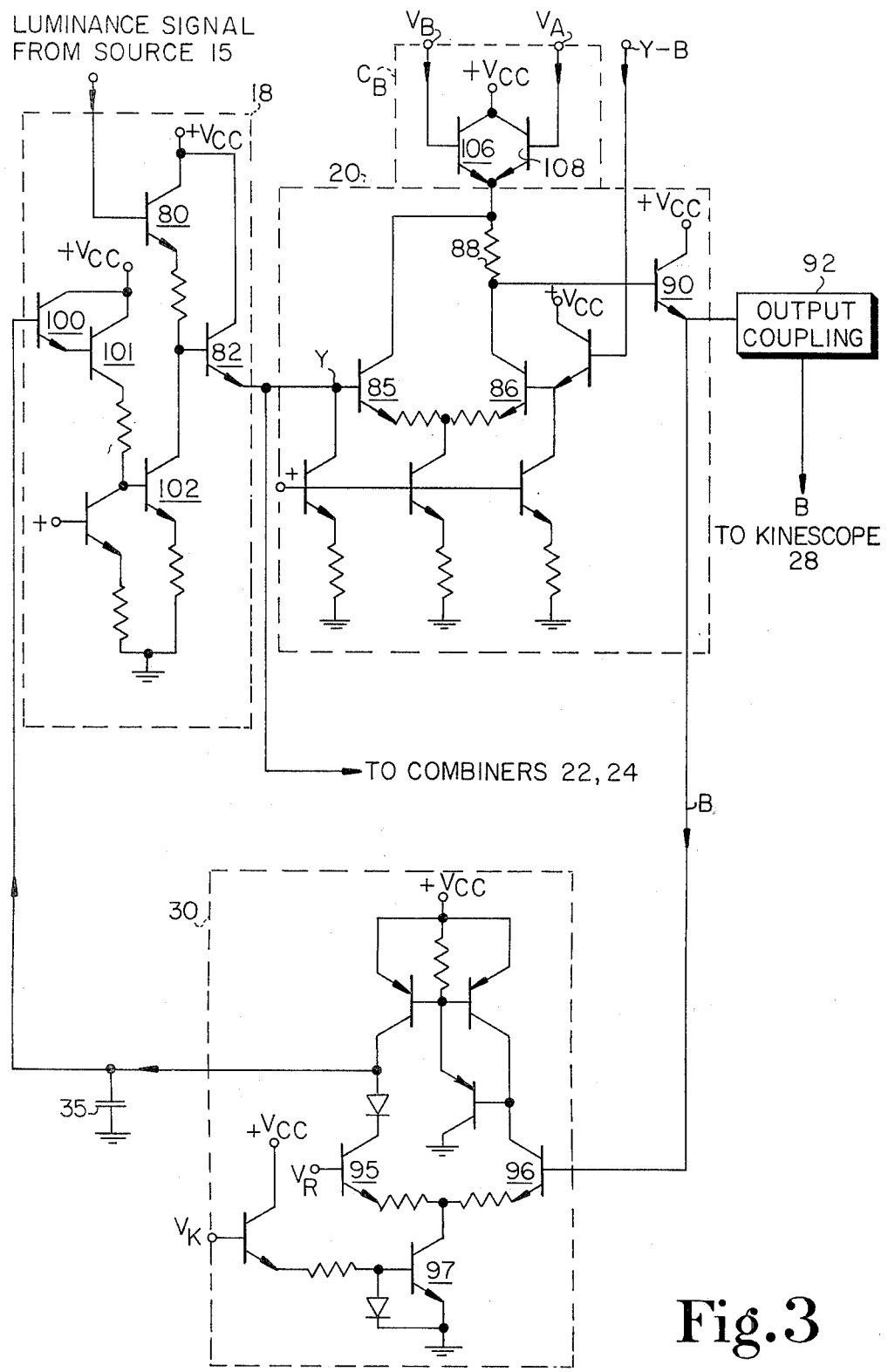
FIG. 3 illustrates circuit details of portions of the arrangement of FIG. 1 which operate in conjunction with the brightness control apparatus.

FIG. 3 shows circuit details of luminance signal coupling network 18, combiner 20, coupling network $C_B$ and the black level clamp including comparator 30 and storage capacitor 35 of FIG. 1. Only signal combiner 20 and coupling network $C_B$ are shown in detail in FIG. 3, since signal combiners 20, 22, 24 are similar and coupling networks $C_B$, $C_G$ and $C_R$ are similar.

In FIG. 3, the luminance signal from source 15 is coupled via transistors 80 and 82 of coupling network 18 to provide luminance signal Y at an output. Combiner 20 includes a matrix amplifier comprising differentially connected transistors 85 and 86 which respectively receive the Y signal from network 18 and the Y-B color difference signal from chrominance processor 12 (FIG. 1). Color signal B is developed across a signal combining load resistor 88 in the collector output circuit of transistor 88, and is applied to kinescope 28 via a transistor 90 and suitable output coupling circuits 92, e.g., including blanking and video driver stages.

Comparator 30 comprises differentially connected comparator transistors 95 and 96, which respectively sense reference voltage $V_R$ and the black reference level of signal B supplied from the emitter output of transistor 90, and a current source including a transistor 97 which is keyed to conduct in response to signal $V_K$ during the video signal black level reference intervals. At such times, transistors 95 and 96 conduct so as to vary the charge stored on output capacitor 35 according to the difference in magnitude between the sensed input voltages. The control voltage developed on capacitor 35 modifies the DC black reference level of luminance signal Y, as discussed, via transistors 100, 101, 102 and 82 of coupling network 18.

Coupling network $C_B$ includes parallel connected transistors 106 and 108 coupled between a DC operating supply potential ($+V_{cc}$) and load resistor 88 in the output circuit of transistor 86. The base electrodes of transistors 106 and 108 respectively receive voltages $V_A$ and $V_B$ derived from switching control circuit 40 shown in FIG. 2. In operation, transistor 108 is non-conductive and transistor 106 is conductive during the video signal picture intervals in response to the action of switching circuit 72, 74 of network 40 shown in FIG. 2. Accordingly, brightness control voltage $V_B$ as appearing on the base of transistor 106 varies the collector voltage of transistor 86. The DC level of the video signal developed across resistor 88, and thereby the brightness of a reproduced image, vary accordingly. Conversely, during video signal black level reference intervals, transistor 106 is non-conductive and transistor 108 is conductive in response to bias reference voltage $V_A$. Thus during image intervals the DC voltage of load resistor 88 is a function of variable brightness control voltage $V_B$, while during the black level reference intervals the DC voltage of resistor 88 is a function of fixed voltage $V_A$.

What is claimed is:

1. In a color television receiver system including a video signal transmission path for processing a color image representative video signal, said transmission path including a chrominance channel for processing a chrominance component of said video signal, and a luminance channel for processing a luminance component of said video signal having periodically recurring image intervals and image blanking intervals between adjacent image intervals and comparing a reference interval containing a black reference level; means for combining signals processed by said luminance and chrominance channels; and means for supplying output signals from said combining means to an image reproducing device; apparatus comprising:

clamping means, including charge storage means, responsive to an output signal from said combining means for maintaining a desired condition of said black reference level, said clamping means being operative during said reference intervals and inoperative during said image intervals;

a source of variable brightness control voltage; and means for selectively coupling said brightness control voltage to said video signal transmission path during said image intervals for varying the DC level of said video signal to thereby vary the brightness of a reproduced image, and for decoupling said brightness control voltage from said signal transmission path during said black level reference intervals to prevent said clamping means from responding to said variable brightness control voltage; wherein said combining means comprises a matrix amplifier responsive to said luminance and chrominance components for developing an output color image representative signal across a load impedance;

said brightness control voltage is selectively coupled to said load impedance during said image intervals independent of the signal gain of said matrix amplifier, and decoupled from said load impedance during said black level reference intervals; and said clamping means is coupled to said load impedance for sensing the condition of said black reference level.

2. Apparatus according to claim 1, wherein said selective coupling means additionally supplies a bias reference voltage to said load impedance during said black level reference intervals.

* * * * *